C. FORSCHNER.
Rendering Apparatus.
No. 57,111
Patented Aug. 14, 1866.
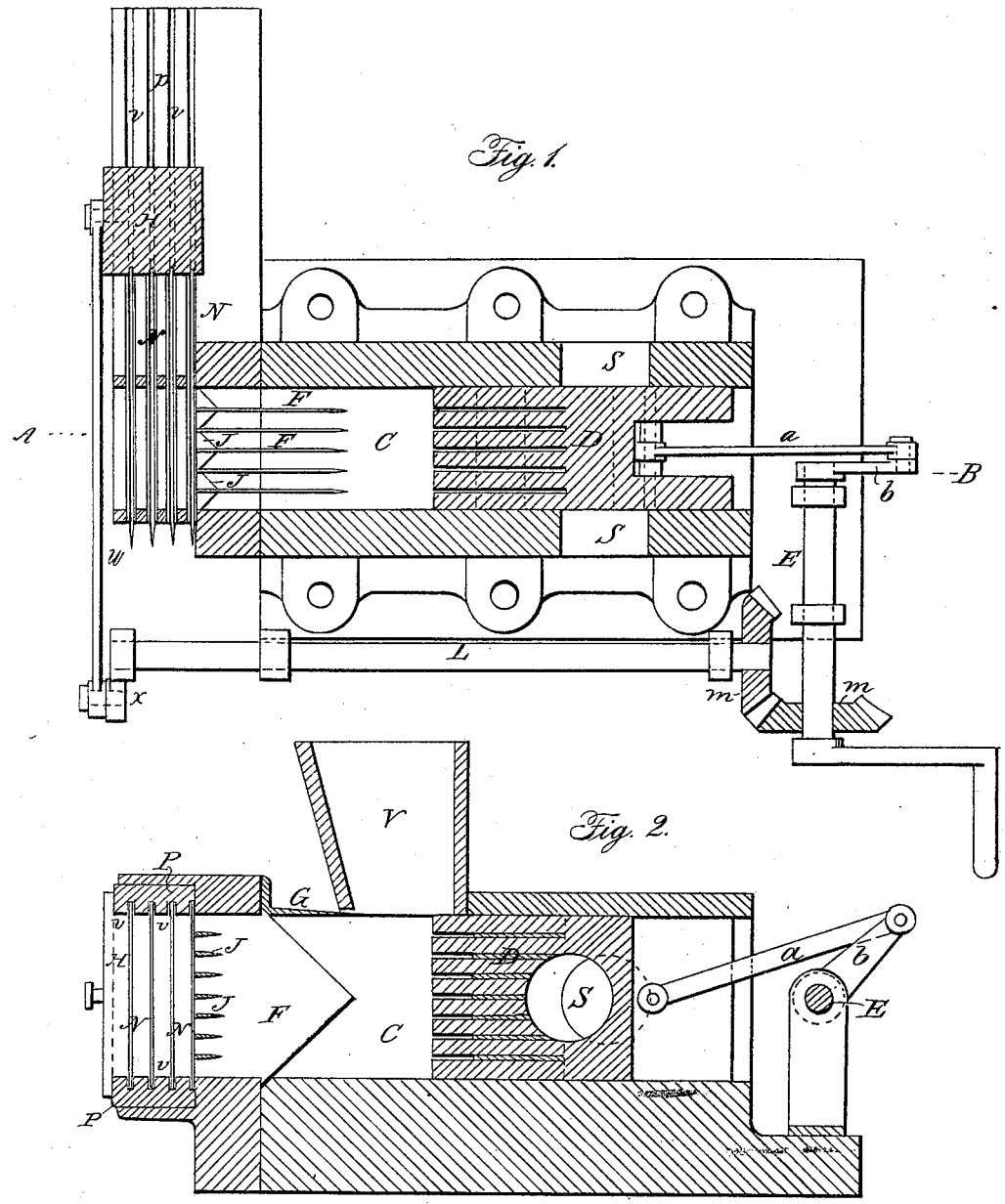

C. Foster,
Railroad-Tank Feeder,
No. 57,112. Patented Aug. 14, 1866.
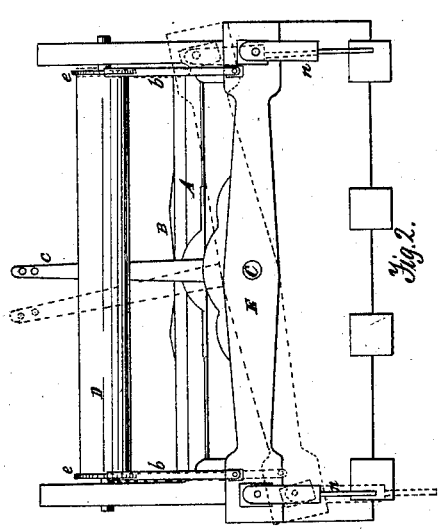
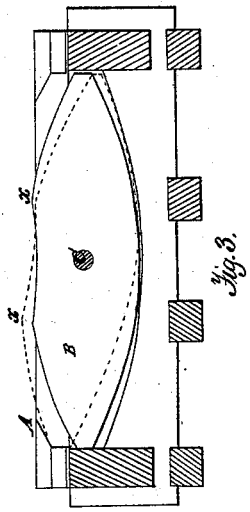
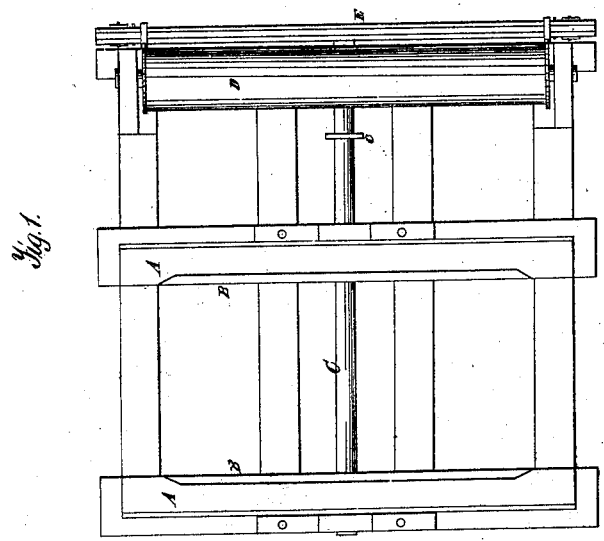
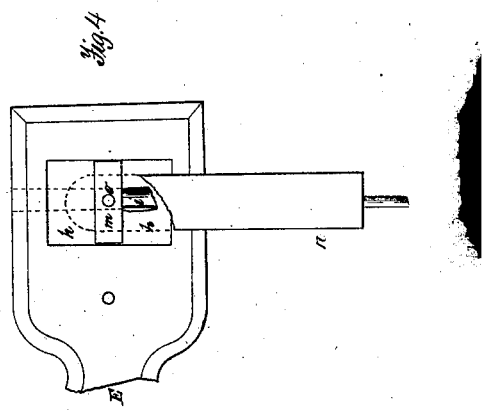
Witnesses.
P. T. Dodge
Chas H Van Patten
Inventor.
Clinton Foster
By M C Dodge
Attorney.